United States Patent [19]

Kesterman et al.

[11] Patent Number: 5,174,345

[45] Date of Patent: * Dec. 29, 1992

[54] DROP TUBES AND OVERFILL VALVES THEREFOR

[75] Inventors: James E. Kesterman, Cincinnati, Ohio; Jack A. McMath, Fort Thomas

[73] Assignee: Dover Corporation, New York, N.Y.

[ * ] Notice: The portion of the term of this patent subsequent to Jan. 22, 2008 has been disclaimed.

[21] Appl. No.: 566,178

[22] Filed: Aug. 13, 1990

Related U.S. Application Data

[63] Continuation of Ser. No. 335,035, Apr. 7, 1989, Pat. No. 4,986,320, which is a continuation of Ser. No. 108,152, Oct. 13, 1987, abandoned.

[51] Int. Cl.⁵ ............................................. B63B 1/30
[52] U.S. Cl. .................................. 141/198; 137/411; 137/445; 137/630.15; 141/213; 141/216
[58] Field of Search ............... 141/198, 202, 205, 212, 141/213, 216, 229, 86; 137/411, 445, 446, 630, 630.15; 220/86 R; 251/232

[56] References Cited

U.S. PATENT DOCUMENTS

| | | |
|---|---|---|
| Re. 33,555 | 3/1991 | Draft .................................. 141/198 |
| 979,819 | 12/1910 | Anderson ........................... 141/199 |
| 1,219,222 | 3/1917 | Baxter et al. ...................... 141/205 |
| 1,246,033 | 11/1917 | Adams ................................ 141/205 |
| 1,268,947 | 6/1918 | Fell .................................... 141/205 |
| 1,289,490 | 12/1918 | Lundstrom ......................... 141/205 |
| 1,313,386 | 8/1919 | Jones ................................. 141/205 |
| 1,689,066 | 10/1928 | Baxter ............................... 141/220 |
| 2,340,936 | 2/1944 | Cook .................................. 137/386 |
| 2,499,409 | 3/1950 | Norway ............................. 137/441 |
| 2,507,545 | 5/1950 | Samiran ............................ 137/429 |
| 2,685,891 | 8/1954 | Segelhorst et al. ............. 137/614.16 |
| 2,811,179 | 10/1957 | Greenwood ........................ 141/95 |
| 2,839,082 | 6/1958 | Moore ............................. 137/630.15 |
| 2,918,931 | 12/1959 | Siri ................................... 137/211 |
| 2,918,932 | 12/1959 | Few .................................. 137/211 |
| 3,078,867 | 2/1963 | McGillis et al. .................. 137/416 |
| 3,610,273 | 10/1971 | Russell ............................ 137/513.3 |
| 3,661,175 | 5/1972 | Tillman ............................. 137/517 |
| 3,791,407 | 2/1974 | Nichols .......................... 137/512.15 |
| 3,794,077 | 2/1974 | Fanshier ......................... 137/513.3 |
| 3,963,041 | 6/1976 | McGillis ............................ 137/410 |
| 4,308,894 | 1/1982 | Carpentier ..................... 137/630.15 |
| 4,667,711 | 5/1987 | Draft ................................ 141/198 |
| 4,986,320 | 1/1991 | Kesterman et al. ............. 141/198 |

FOREIGN PATENT DOCUMENTS

| | | |
|---|---|---|
| 1360869 | 4/1964 | France . |
| 2205166 | 5/1974 | France . |
| 2770198 | 12/1975 | France . |
| 2331732 | 6/1977 | France . |
| 2355736 | 1/1978 | France . |
| 1444260 | 7/1976 | United Kingdom . |
| 1531083 | 1/1978 | United Kingdom . |

Primary Examiner—J. R. Scott
Attorney, Agent, or Firm—Kinney & Schenk

[57] ABSTRACT

A drop tube employed in the discharge of fuel into a storage tank of the type having an inlet, riser pipe is described. The drop tube a tubular member and an overfill valve. The overfill valve comprises a valve member having open and closed positions which is controlled by a float mounted thereon. The drop tube is insertable through the riser pipe to a position wherein the float displaces the valve member towards its closed position when the fuel in the tank reaches a desired level. A depression in the tubular member receives the float to facilitate insertion of the drop tube through the riser pipe. The valve member is freely pivotal from its open position to its closed position, being displaced thereto by the force of fuel discharged into the tank. A pressure relief valve provided to reduce the forces on the valve. A bleed valve is also provided for bleeding fuel from above the valve when it is in its closed position. Further mechanism, actuated by the float, close the bleed valve when the level of fuel is at a predetermined height above its desired level.

41 Claims, 6 Drawing Sheets

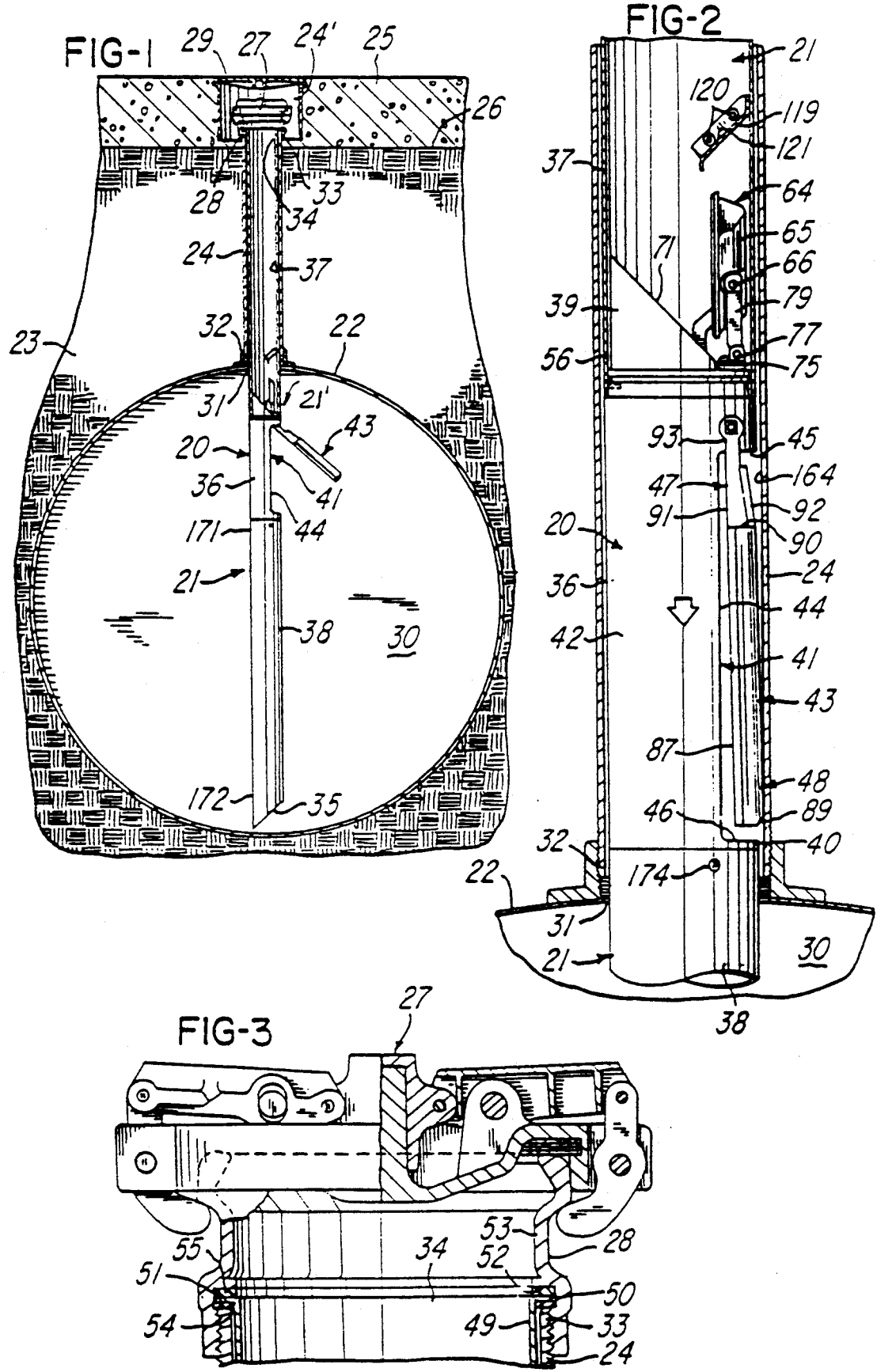

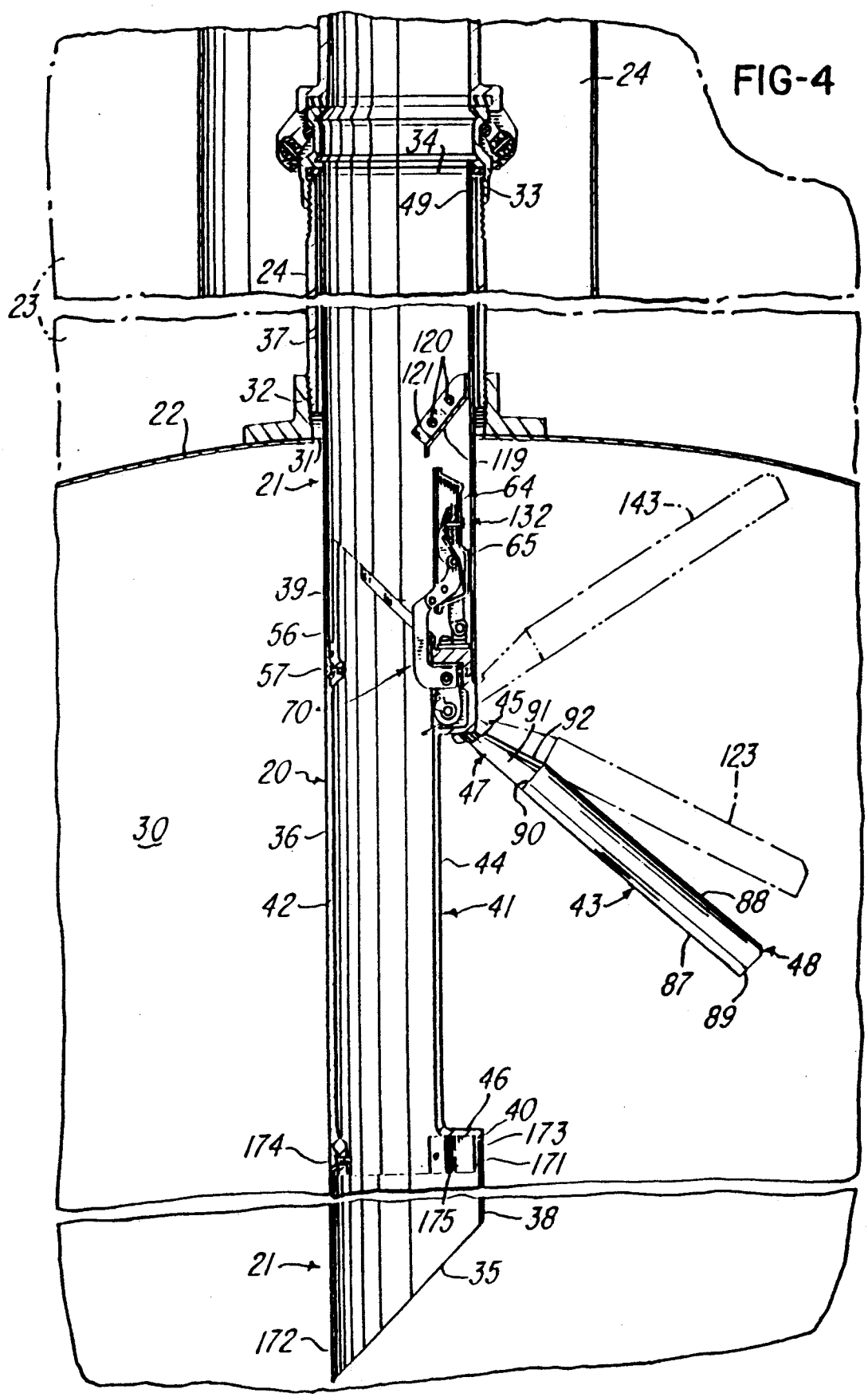

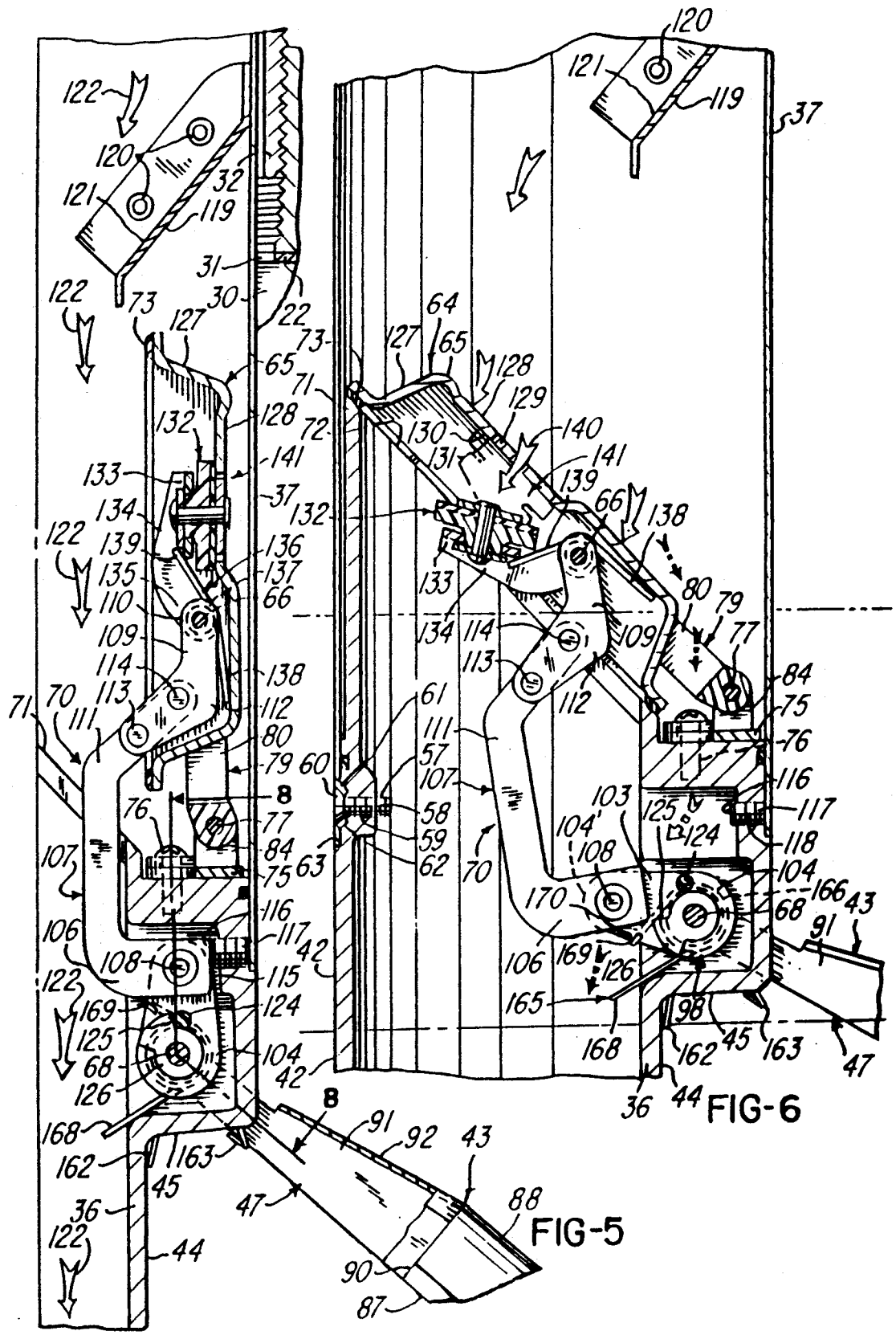

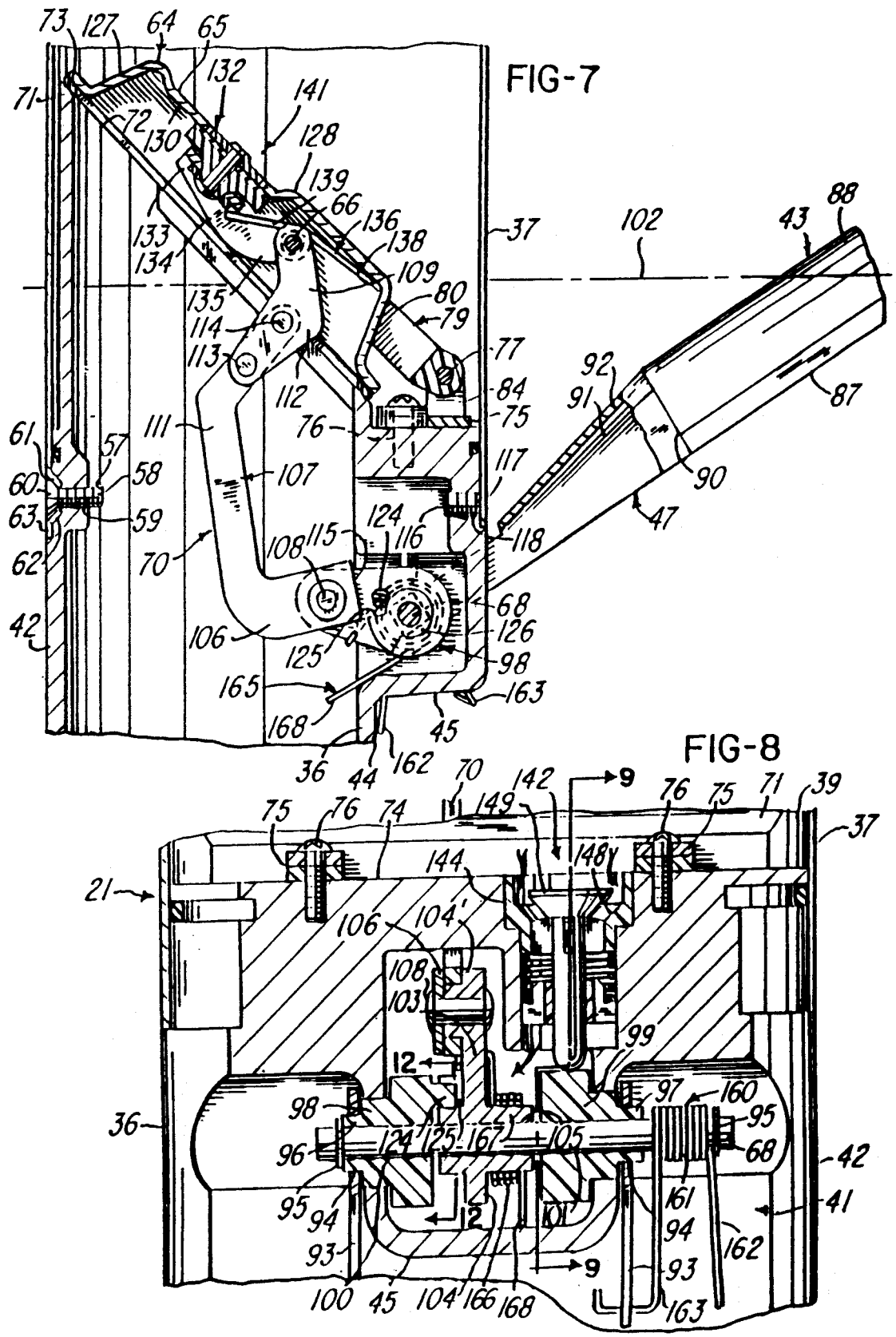

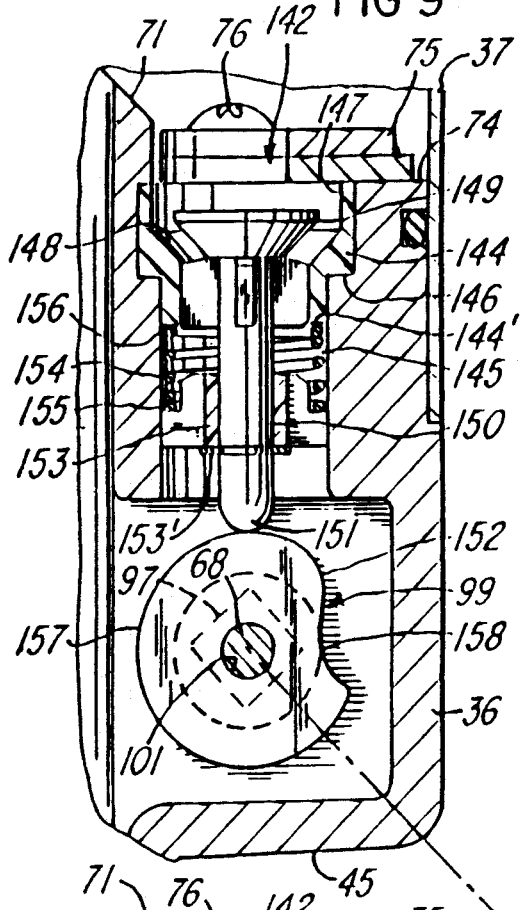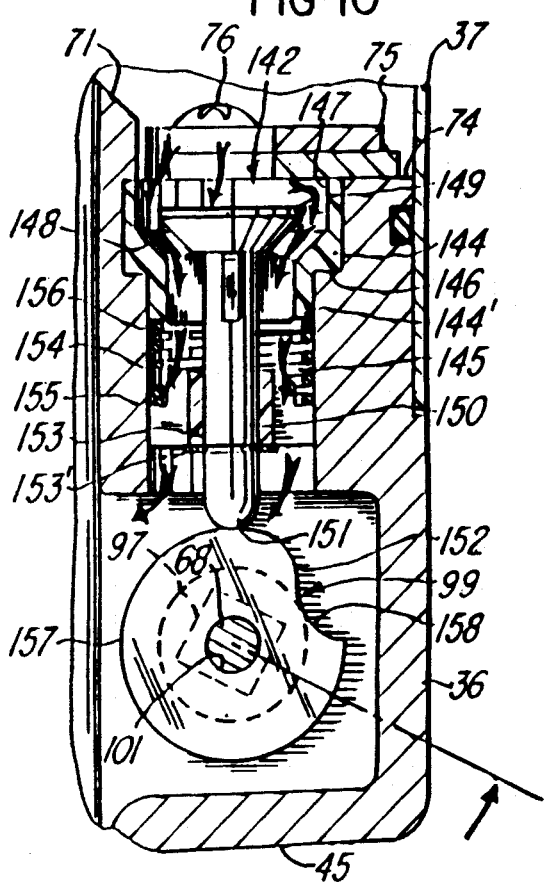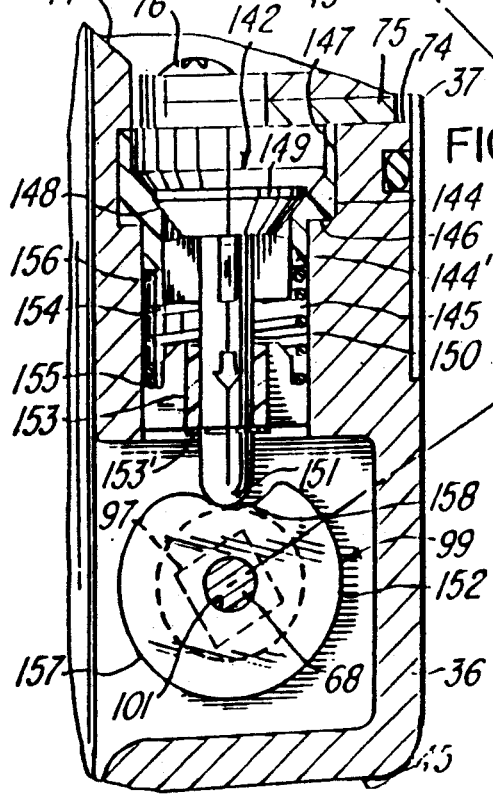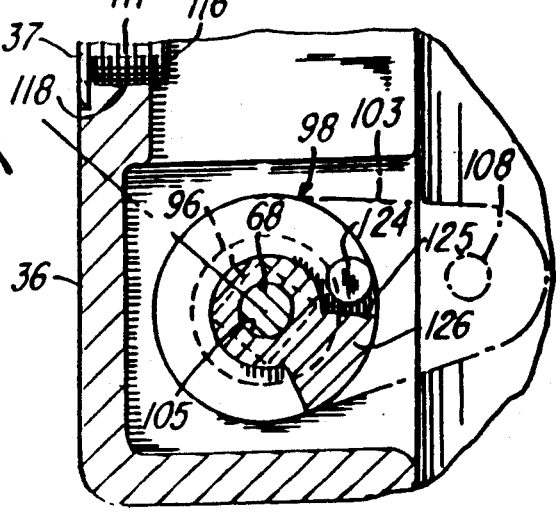

DROP TUBES AND OVERFILL VALVES THEREFOR

RELATED APPLICATIONS

This application is a continuing application of Ser. No. 335,035, filed Apr. 7, 1989 now U.S. Pat. No. 4,986,320, which was a continuing application of Ser. No. 108,152 filed Oct. 13, 1987, now abandoned.

BACKGROUND OF THE INVENTION

1. Field of the Invention

This invention relates to a new overfill valve which is adapted to be incorporated in a drop tube used with a storage tank means having a chamber therein for storing liquid fuel.

2. Prior Art Statement

It is known to provide an overfill valve construction for use in a storage tank means having a chamber therein for storing liquid fuel and the like and having an inlet riser pipe means extending therefrom, the construction comprising a drop tube means for being inserted through the riser pipe means and have a portion thereof disposed within the storage tank, a valve means in the drop tube means and having a valve seat and a movable valve member for opening and closing the valve seat so as to tend to close the drop tube means between the opposed ends thereof, and float means operatively interconnected to the valve member to cause closing of the valve member when the float means is raised to a certain position relative to the portion by rising liquid in the storage tank means. For example, see the U.S. Pat. to Draft, No. 4,667,711.

It is also known to provide such an overfill valve construction wherein the valve member has an opening means therethrough for interconnecting the area of the drop tube means on one side of the valve means to the area of the drop tube means on the other side of the valve means even when the valve member is closed against the valve seat. For example, see the aforementioned U.S. Pat. to Draft, No. 4,667,711.

It is also known to provide such an overfill valve construction wherein the valve member is pivotally mounted to the drop tube means by a first pivot shaft means and the float means is operatively mounted to the drop tube means by a second pivot shaft means. For example, see the aforementioned U.S. Pat. to Draft, No. 4,667,711.

SUMMARY OF THE INVENTION

It is one feature of this invention to provide a new overfill valve which is adapted to be incorporated in a drop tube used with a storage tank having a chamber therein for storing liquid fuel and the like and having an inlet riser pipe means extending therefrom, the new overfill valve construction having unique means for containing the float means therein as the drop tube means has a portion thereof inserted through the riser pipe means to be received in the chamber of the storage tank means.

In particular, the prior known drop tube means has an enlarged opening in the sidewall means thereof and into which the float means is disposed so that the drop tube means can be inserted through the riser pipe means, such opening means being adapted to be thereafter closed by sliding an internal annular shield means of the drop tube means in place.

However, it was found according to the teachings of this invention, that the sidewall means of the drop tube means could be provided with a depressed area or depression therein and in which the float means could be disposed so as to be maintained substantially within the outline of the drop tube means when the drop tube means is inserted through the riser pipe means so that such prior known large opening means in the sidewall means is not now necessary.

For example, one embodiment of this invention provides an overfill valve for use in a storage tank means having a chamber therein for storing liquid fuel and the like and having an inlet riser pipe means extending therefrom, the overfill valve is part of a drop tube means for being inserted through the riser pipe means and have a portion thereof disposed within the storage tank means, a valve means in the drop tube means and having a valve seat and a movable valve member for opening and closing the valve seat so as to tend to close the drop tube means between the opposed ends thereof, and float means operatively interconnected to the valve member to cause closing of the valve member when the float means is raised to a certain position relative to the portion by rising liquid in the chamber of the storage tank means, the portion having an external wall that defines a generally cylindrical tubular section that has a generally circular transverse cross-sectional configuration throughout the length thereof except for a depressed area therein and in which the float means can be disposed so as to be maintained substantially within the outline of the configuration when the drop tube means has the portion inserted through the riser pipe means to be received in the chamber of the storage tank means.

It is another feature of this invention to provide a new overfill valve which is adapted to be incorporated in a drop tube used with a storage tank means and wherein the initial shock loading of the upstream flow of liquid on the main poppet valve member thereof is relieved in a unique manner when the main valve member initially closes.

In particular, the prior known overfill valve construction, while having an opening means through the main valve member for interconnecting the area of the drop tube means on one side of the valve means to the area on the other side of the valve means so as to permit a reduced flow of fuel to be dispensed through the drop tube means when the main valve member is closed, permits an initial shock loading of the fuel against the main valve member when the same initially closes because the opening means cannot be made sufficiently large to effectively reduce the initial shock loading and still perform its function of providing a reduced continuous flow through the drop tube means after the main valve member is closed.

However, it was found according to the teachings of this invention that the main valve member can be provided with an opening means therethrough of a size which will initially permit sufficient fuel to flow therethrough upon the initial closing of the main valve member so that the shock of the fuel flow bearing against the initially closed poppet valve member will not be so great and then means can be provided for closing such opening means so that other means can be provided for permitting a reduced flow rate of fuel to pass through the closed drop tube means.

For example, one embodiment of this invention provides an overfill valve which is adapted to be incorporated in a drop tube used with a storage tank means having a chamber therein for storing liquid fuel and the like and having an inlet riser pipe means extending therefrom, the overfill valve is part of a drop tube means for being inserted through the riser pipe means and have a portion thereof disposed within the storage tank means, a poppet valve means in the drop tube means and having a valve seat and a movable valve member for opening and closing the valve seat so as to tend to close the drop tube means between the opposed ends thereof, and float means operatively interconnected to the valve member to cause closing of the valve member when the float means is raised to a certain position relative to the portion by rising fluid in the chamber of the storage tank means, the valve member having an opening means therethrough for interconnecting the area of the drop tube means on one side of the valve means to the area of said drop tube means on the other side of the valve means even when the valve member is closed against the valve seat, the valve member carrying a second valve member for opening and closing the opening means.

It is another feature of this invention to provide a new overfill valve which is adapted to be incorporated in a drop tube used with a storage tank means and wherein unique means are provided for bypassing a reduced flow of fuel around the closed main valve means thereof.

In particular, as previously set forth, the prior known overfill valve construction has an opening means through the main valve member which permits a reduced flow of fuel to flow therethrough when the main valve member is disposed in the closed condition thereof and it was found that such an arrangement resulted in a relatively large shock loading to be imposed upon the valve member when the same is first disposed in its closed position.

However, it was found according to the teachings of this invention that an opening means can be provided through the main valve member of a sufficient size so as to initially reduce the shock loading thereon when the main valve member is initially closed and that such opening means can be subsequently closed by a valve member carried by the main valve member. In addition, the overfill valve can be provided with a poppet valve means for providing a reduced flow of fuel therethrough that bypasses the main valve means and that the float means can be operatively interconnected to the valve member of the poppet valve means to cause closing of the valve member thereof when the float means is raised to a certain position by rising liquid in the chamber of the storage tank means.

For example, one embodiment of this invention provides an overfill valve which is adapted to be incorporated in a drop tube used with a storage tank means having a chamber therein for storing liquid fuel and the like and having an inlet riser pipe means extending therefrom, the construction comprising a drop tube means for being inserted through the riser pipe means and have a portion thereof disposed within the storage tank means, a valve means in the drop tube means and having a valve seat and a movable valve member for opening and closing the valve seat so as to tend to close the drop tube means between the opposed ends thereof, and float means operatively interconnected to the valve member to cause closing of the valve member when the float means is raised to a certain position relative to the portion by rising liquid in the chamber of the storage tank means, the drop tube means a bleed passage and poppet valve means disposed therein and comprising a second valve seat that bypasses the first named valve seat and a second movable valve member for opening and closing the second valve seat, the float means being operatively interconnected to the second valve member to cause closing of the second valve member when the float means is raised to another certain position relative to the portion by rising liquid in the chamber of the storage tank means.

It is another feature of this invention to provide a new overfill valve which is adapted to be incorporated in a drop tube used with a storage tank means and wherein unique means are provided for interconnecting the float means to the valve member thereof for controlling the operation of the valve member.

In particular, the prior known overfill valve construction has the interconnection means between the float means and the main valve member so arranged that the float means is subjected to the shock forces that are imposed upon the main valve member as the main valve member is forced closed by the fuel being directed thereagainst.

However, it was found according to the teachings of this invention that unique link means can be provided to operatively interconnect the float means to the valve member so that the poppet valve member will not transmit shock loading forces that are imposed thereon to the float means.

For example, one embodiment of this invention provides an overfill valve which is adapted to be incorporated in a drop tube used with a storage tank means having a chamber therein for storing liquid fuel and the like and having an inlet riser pipe means extending therefrom, the construction comprising a drop tube means for being inserted through the riser pipe means and having a portion thereof disposed within the storage tank means, a valve means in the drop tube means and having a valve seat and a movable valve member for opening and closing the valve seat so as to tend to close the drop tube means between the opposed ends thereof, float means operatively interconnected to the valve member to cause closing of the valve member when the float means is raised to a certain position relative to the portion by rising liquid in the chamber of the storage tank means, the valve member being pivotally mounted to the drop tube means by a first pivot shaft means, said float means being pivotally mounted to the drop tube means by a second pivot shaft means, and a link means being pivotally mounted to the first and second pivot shaft means and controlling the closing movement of the valve member from a certain open position thereof.

Accordingly, it is an object of this invention to provide a new overfill valve which is adapted to be incorporated in a drop tube used with a storage tank means having a chamber therein for storing liquid fuel and the like, the overfill valve construction of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a fragmentary, cross-sectional view illustrating the new overfill valve construction of this invention having been assembled with an under the ground storage tank means that has a chamber therein for storing liquid fuel and the like.

FIG. 2 is an enlarged fragmentary cross-sectional view illustrating the method of this invention for inserting the overfill valve construction of this invention through the inlet riser pipe means of the storage tank means of FIG. 1.

FIG. 3 is an enlarged, fragmentary, cross-sectional view illustrating the closure means for closing the inlet end of the riser pipe means of the storage tank means of FIG. 1.

FIG. 4 is an enlarged, fragmentary, cross-sectional view of part of the arrangement illustrated in FIG. 1 and illustrates the various operating positions of the float means of the overfill valve construction of this invention.

FIG. 5 is an enlarged, fragmentary, cross-sectional view of a portion of the structure illustrated in FIG. 4 and illustrates the main valve member in the full open position thereof.

FIG. 6 is an enlarged, fragmentary, cross-sectional view of a portion of the arrangement of FIG. 4 and illustrates the main valve member in its initially closed position.

FIG. 7 is a view similar to FIG. 6 and illustrates the float means of the overfill valve construction of this invention in a position thereof that causes the closing of another valve means of the overfill valve construction, such other valve means being shown in FIGS. 8-11.

FIG. 8 is an enlarged, fragmentary, cross-sectional view taken substantially on line 8—8 of FIG. 5.

FIG. 9 is an enlarged, fragmentary, cross-sectional view taken substantially on line 9—9 of FIG. 8 and illustrates a bypass poppet valve means of the overfill valve construction of this invention in its open condition.

FIG. 10 is a view similar to FIG. 9 and illustrates how the poppet valve means performs its bypass function.

FIG. 11 is a view similar to FIG. 9 and illustrates the poppet valve member of the bypass poppet valve means in its closed condition.

FIG. 12 is an enlarged, fragmentary, cross-sectional view taken substantially on line 12—12 of FIG. 8 and illustrates the drive means of the float means in the position thereof that has caused the main valve member of FIG. 6 to be in the closed condition thereof.

DESCRIPTION OF THE PREFERRED EMBODIMENT

Figure 13:
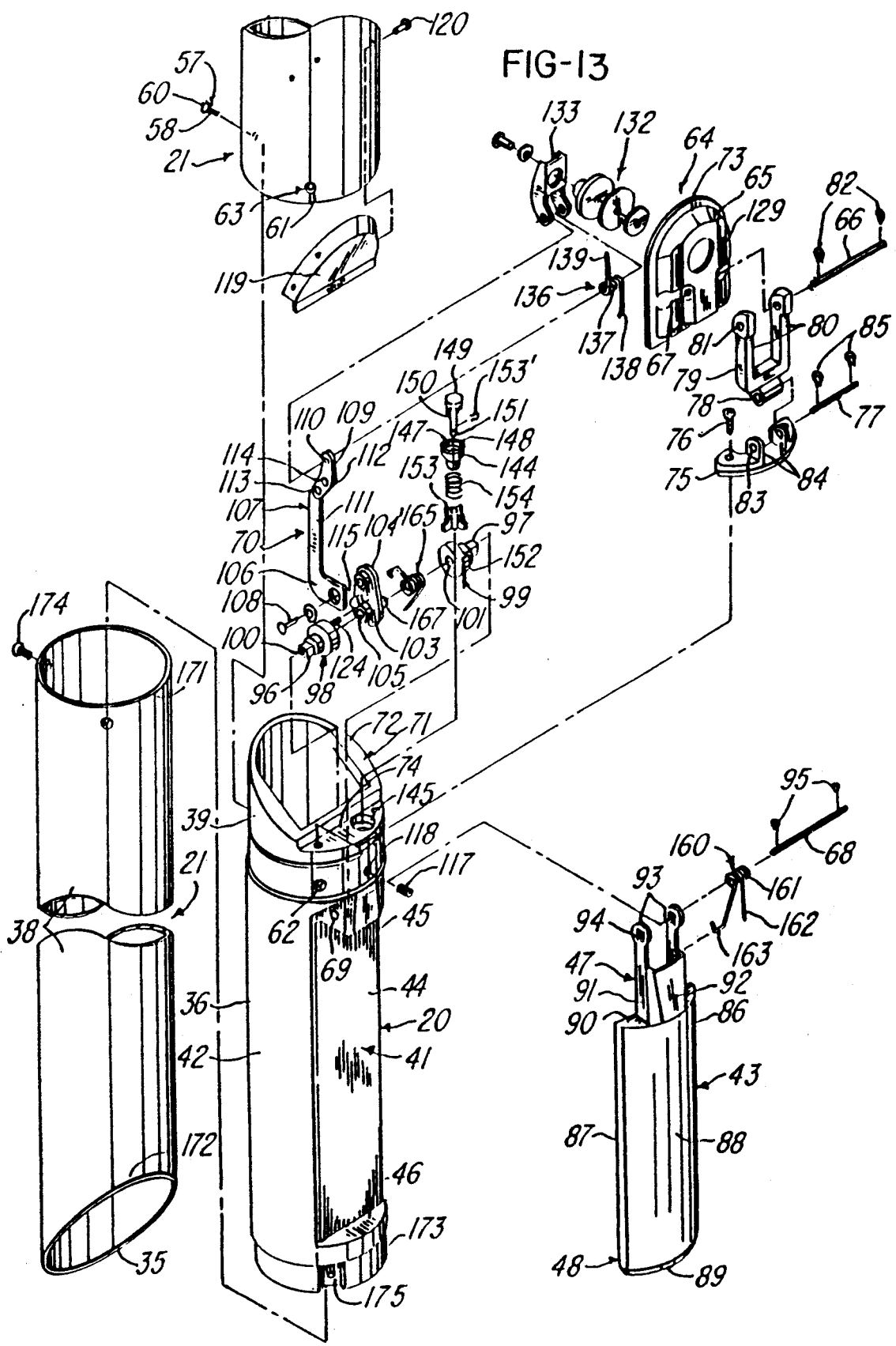
FIG. 13 is an exploded perspective view of the various parts of the overfill valve construction of this invention.

While the various features of this invention are hereinafter illustrated and described as being particularly adapted to provide an overfill valve which is adapted to be incorporated in a drop tube used with a storage tank means having a compartment therein for storing liquid fuel and the like and having an inlet riser pipe means extending therefrom, it is to be understood that the various features of this invention can be utilized singularly or in various combinations thereof to provide a valve construction for other apparatus as desired.

Therefore, this invention is not to be limited to only the embodiment illustrated in the drawings, because the drawings are merely utilized to illustrate one of the wide variety of uses of this invention.

Referring now to FIG. 1, the drop tube of this invention is generally indicated by the reference numeral 20 and comprises a compositely formed tubular member 21 and an overfill valve that has been assembled in its operative position in an under the ground storage tank means 22 that had been buried in the ground 23 and has an inlet riser pipe means 24 extending to a manhole chamber means 24' that had also been buried in the conventional cement surface layer means 25 disposed on the top 26 of the ground 23 and providing access to a cover plate means 27 at the inlet end means 28 of the riser pipe means 24 through a removable manhole cover 29 in a manner well known in the art.

The storage tank means 22 has a chamber 30 therein for storing liquid fuel and the like and has an upper opening 31 interconnected to a lower end means 32 of the riser pipe means 24 which is substantially cylindrical and has a substantially uniform circular cross-sectional configuration throughout the length thereof, the riser pipe means 24 being secured to the storage tank 22 in alignment with the opening 31 thereof in any suitable manner and having an inlet end 33 thereof adapted to be opened and closed by the removable cover means 27 in the manner illustrated in FIG. 3. Since such structure is well known in the art, a further description thereof is deemed unnecessary except to state that when it is desired to dispense fuel into the chamber 30 of the storage tank means 22, the manhole cover 29 is removed and the riser pipe closure cap means 27 is also removed so that fuel can be disposed in an upper end 34 of the drop tube 20 that is secured in the upper end 33 of the riser pipe means 24 in a manner hereinafter set forth and be directed into the chamber 30 out through a lower open end 35 of the drop tube 20.

Such a general arrangement for a drop tube in connection with a storage tank means and its riser pipe means is well known in the art, such as is set forth in the aforementioned U.S. Pat. to Draft, No. 4,667,711 whereby this patent is being incorporated into this disclosure by this reference thereto. Therefore, since the use of a drop tube is well known in the art, only the details of the new overfill valve 21 of this invention will now be described.

The tubular member 21 comprises three portions or sections 36, 37 and 38, the portion 36 being a housing formed of any suitable material and in any suitable manner, such as by being formed from a casting of aluminum or the like. The housing 36 is substantially tubular or cylindrical and has a substantially uniform circular cross-sectional configuration from one end 39 thereof to another end 40 thereof except for a depression, or depressed area, 41 that is formed in a sidewall means 42 of the housing 36 so as to contain therein a float means 43 of the overfill valve construction 20 in a manner hereinafter set forth when the drop tube means 21 is being inserted through the inlet riser pipe means 24 in the manner illustrated in FIG. 2, the depressed area 41 is defined by a substantially flat length 44 of the sidewall means 42 formed as a chord of the circular cross section and a pair of opposed facing substantially flat shoulder means 45 and 46 adjacent which opposed ends 47 and 48 of the float means 43 are respectively adapted to be disposed when the float means 43 is moved into the depressed area 41 in the manner illustrated in FIG. 2.

The upper section 37 of the tubular member 21 functions as an upper extension of the housing 36 and comprises a substantially tubular or cylindrical metallic member having an upper end 49 provided with an outwardly turned annular flange 50 which is adapted to be trapped between an upper end surface 51 of the riser pipe means 24 and a shoulder 52 of an upper coupling member 53 threadedly secured to the riser pipe means 24 and defining the end means 28 thereof that is adapted to be opened and closed by the cover means 27. The upper annular flange 50 of the section 37 is adapted to be sealed in the riser pipe means 24 by opposed sealing means 54 and 55 respectively disposed on opposite sides of the flange 50 and adjacent the shoulders 51 and 52 as illustrated in FIG. 3.

A lower end 56 of the tubular extension 37 is adapted to be telescoped over the upper end 39 of the intermediate housing portion 36 and be secured thereto by a plurality of threaded fastening means 57. For example, the fastening means 57 can each comprise a standard countersunk screw respectively having a threaded shank portion 58 received in a threaded bore 59 in the housing 36 and have an enlarged head 60 thereof compress an annular portion 61 of the material of the extension 37 into a respective oversized countersunk area 62 of the sidewall means 42 of the housing 36 so as to provide a relatively large area 63 of the housing 36 against which relatively large areas 61 of the housing 36 are held by the heads 60 of the fastening members 57 so as to prevent breaking away of the upper extension 37 from the housing 36 at the time that tremendous pressure or load is being utilized to close a main valve means 64 of the overfill valve 21 in a manner hereinafter set forth.

The main valve means 64 comprises a main valve member 65 that is pivotally mounted to a shaft means 66 that passes through suitable opening means 67, FIG. 13, of the valve member 65, the shaft means 66 being effectively interconnected to another shaft means 68 generally carried by the housing 36 and being disposed in suitable opening means 69 thereof in a manner hereinafter set forth by unique link means 70 in a manner hereinafter set forth. The main valve means 64 includes a main valve seat means 71 that is substantially annular and is spaced above the shoulder means 45 while being disposed at an angle relative to the longitudinal axis of the drop tube means 21, such as 45° as illustrated, the valve seat 71 comprising an annular flat surface 72 against which an annular sealing means 73 molded on the valve member 65 is adapted to seal against in the closed manner illustrated in FIG. 6.

The main valve seat 71 is angled from an upper flat section or surface 74 of the shoulder means 45 of the housing 36 and on which a bracket means 75 is fastened by suitable fastening means 76. The bracket means 75 carries another shaft means 77 which passes through a suitable opening means 78 in a yoke member 79 that has a pair of legs 80 thereof receiving the shaft 66 through suitable openings 81 thereof and having the opposed ends of the shaft 66 fastened thereto by conventional C-shaped retaining means 82 so as to pivotally interconnect the valve member 65 also to the shaft 77 which has its opposed ends passing out through suitable openings 83 formed in spaced apart ears 84 of the bracket means 75 and being secured thereto by conventional C-shaped retaining members 85 as illustrated.

The float means 43 comprises an elongated molded body 86 of any suitable float material. The float 86 has a cross section which is a segment of the circular outline of the tubular member 21 having a flat rear side 87 and an arcuate front side 88 formed on a radius approximating the radius of said circular outline with opposed ends 89 and 90, a metallic part 91 being molded with the body part 86 and extending outwardly therefrom to define the end 47 thereof with an angled outer wall 92 tapering toward the casting or portion 36 and having a pair of spaced apart ears 93 receiving the opposed ends of the shaft 68 through suitable openings 94 thereof so that the shaft means 68 can be fastened thereto by conventional C-shaped fastening members 95. The openings 94 in the ears 93 of the float 43 are rectangular in configuration and respectively receive rectangular extensions 96 and 97 of a driver member 98 and a cam member 99 therethrough, the driver member 98 being rotatably mounted on the shaft 68 which passes through a suitable central opening 100 therein and the cam member 99 also being rotatably mounted on the shaft 68 which passes through a suitable opening 101 passing centrally through the cam member 99.

In this manner, the float member or means 43 is pivotally mounted to the section 36 by the shaft means 68 and is formed of any suitable material which will float and rise with the liquid level in the chamber 30 of the storage tank means 22 as that liquid level engages against the float means 43 such as is provided by the liquid level line 102 in FIG. 7.

As previously stated, the shaft means 68 also pivotally mounts the link means 70 to the section 36 of the drop tube means 21, the link means 70 comprising a first link 103 having one end 104 provided with an opening 105 passing therethrough and receiving the shaft 68 therethrough. The end 104 of the link 103 is disposed intermediate the driver member 98 and the cam 99 as illustrated in FIG. 8 and rotates independently thereof. The other end 104' of the link 103 is pivotally interconnected to an end 106 of another link 107 of the link means 70 by a pivot pin means 108 as illustrated, the other end 109 of the link 107 being pivotally mounted to the shaft 66 by having the shaft 66 pass through a suitable opening 110 in the end 109 of the link 107.

The link 107 actually comprises two separate members 111 and 112 fastened together by two fastening means 113 and 114 and is usually formed by the fastening member 113 first being utilized and then adjusting the position of the member 112 relative to the member 111 before utilizing the fastening member 114 so that the link 107 is, in effect, a single link that combines with the link 103 to form the link means 70.

The end 106 of the link 107 has a substantially flat end surface 115 which is utilized for abutting against an end 116 of an adjustable stop member 117 threadedly carried in a threaded bore 118 of the portion or section 36 so as to limit the movement of the link means 70 when the valve member 65 is disposed in a full open position as illustrated in FIG. 5. At this position, the pivot pin means 108 can be seen as being disposed over center in a clockwise direction relative to the shaft 68 so that any force acting downwardly on the valve member 65 would tend to drive the valve member 65 in a clockwise direction about the shaft 68 in FIG. 5 which movement is prevented by the end surface 115 of the link 107 abutting the adjustable stop member 117. Thus, the link means 70, when disposed in the position of FIG. 5, effectively locks the valve member 65 in the full open position thereof.

With the valve member 65 disposed in the full open position illustrated in FIG. 5, it can be seen that a deflector member 119 that is fastened to the upper section 37 by suitable fastening means 120 has the upper surface 121 thereof downwardly angled relative to the interior of the section 37 so as to deflect the fuel being dispenses downwardly through the drop tube means 21 away from the valve member 65 as represented by the arrows 122 in FIG. 5 so that the fuel 122 can pass through the opened valve seat 71 to the lower end 35 of the tubular member 21 to fill the chamber 30. The deflector member 119 also protects the valve member 65 from damage by a gauging stick which is used to check fluid level in the tank.

However, as the liquid level rises in the chamber 30 of the storage tank means 22, the same acts on the float means 43 to raise the same to the position illustrated by dash-dotted lines 123 in FIG. 4 and full lines in FIG. 5 to cause an outwardly directed rod-like drive pin means 124 of the driver member 98, which rotates in unison with the float means 43 on the shaft means 68, into engagement with a surface 125 on an extension 126 of the end 104 of the link 103, providing abutment means to cause the link 103 to rotate in a counterclockwise direction in FIG. 5. As the float means 43 continues to rotate in a counterclockwise direction on the shaft means 68 by the liquid level rising further upwardly, such further counterclockwise movement of the link 103 caused by the driver member 98 being rotated on the shaft 68 by the rising float means 43 causes the link 107 to move outwardly to the left and carry the valve member 65 therewith which pivots on the shafts 66 and 77 so as to have a forward part 127 thereof move out into the stream 122 of fuel flowing downwardly through the drop tube means 21 as represented by the arrows 122 in FIGS. 5 and 6 and, thus, be carried by the downwardly flowing fuel further downwardly to seal closed against the valve seat 71. Such further closing movement of the valve member 65 under the flow of fuel against an upper surface 128 thereof causes the link 103 to rotate on the shaft 68 faster than the float means 43 rotates the driver member 98 thereon so that the surface 125 of the link 103 moves away from the drive rod or portion 124 of the drive member 98 to effectively disconnect the float means 43 from the valve means 64. Thus, any force vibrations caused by the valve member 65 being closed against the valve seat 71 by a large head of liquid above the valve member 65 will not be transmitted back through the linkage means 70 to the float 43 to cause vibration thereof and subsequent deterioration thereof as in the prior known arrangements.

The main valve member 65 has in its upper surface 128, a relatively large opening 129 passing therethrough and defining on the underside 130 thereof an annular valve seat 131 which surrounds the opening 129 and is adapted to be opened and closed by a valve member 132 which is carried on an end 133 of a lever 134 which has its other end 135 pivotally mounted to the shaft means 66. The lever 134 is urged in a clockwise direction in FIG. 6 about the shaft means 66 by a spring means 136 that has a coiled body portion 137 disposed on the shaft means 66 and one opposed end 138 that bears against the underside 130 of the valve member 65 and the other opposed end 139 which bears against the valve member 132, the spring 136 being coiled and retained in such a manner that the same always has a tendency to move and hold the valve member 132 in its closed condition against the valve seat 131 in the manner illustrated in FIGS. 5 and 7.

However, when the main valve member 65 is first forced to its closed condition against the valve seat 71 by the flow 122 of fuel downwardly through the drop tube means 21 in the manner previously set forth, the shock load or head of fuel that closes the valve member 65 forces open the second valve member 132 in opposition to the force of the spring means 136 in the manner illustrated by the arrow 140 in FIG. 6 so as to flow through the opening means 129 and thereby relieve the relatively large amount of the fuel that would be slamming against the valve member 65 above the same as the valve member 65 initially closes against the valve seat 71.

In this manner, the opening 129 can be larger than the flow reducing opening in the prior known arrangement so as to permit a large flow of fuel through the opening 129 rather than only a very small restricted flow as in the prior known arrangements whereby the valve means 64 in combination with the valve means 141 that comprises the opening 129 and valve member 132 reduces the pressure and resultant shock loading that would occur on the main valve member 65 when the same initially closes against the valve seat 71.

However, after the initial shock load of fuel 140 has passed through the opening 129 of the closed valve member 65, the force of the spring 136 is sufficient to then close the valve member 132 against the valve seat 131 even though a head of fuel still is disposed in the drop tube means 21 above the poppet valve member 65 and an attempt is being made to continue to flow further liquid into the drop tube means 21 by a tank car or the like as will be apparent hereinafter.

Once the poppet valve means 64 has closed and the other poppet valve means 141 has subsequently closed as previously set forth, a poppet valve means of this invention that is generally indicated by the reference numeral 142 in FIGS. 8-11 is utilized to provide a reduced flow of fuel through the drop tube means 21 into the chamber 30 of the storage tank means 22 at a controlled rate since the level 102 of liquid in the storage tank 22 has closed the main valve means 64 while there is still a portion of the chamber 30 yet to be filled with fuel as the liquid level 102 is approximately 8 inches from the top of the chamber 30 when the float means 43 causes the main valve means 64 to close as previously set forth.

However, when the poppet valve means 142 is in the open position thereof, the same is adapted to only bleed fuel therethrough, at a much reduced rate, such as about two gallons per minute, into the storage tank 22 in a bypassing manner around the main valve seat 71 as will be apparent hereinafter so that it will take several hours between the time the main poppet valve means 64 closes and the poppet valve means 142 would permit the tank means 22 to fill to a new level thereof where the float means 43 will cause closing of the poppet valve means 142 in a manner hereinafter set forth.

Thus, it can be seen that the operator, who is filling the storage tank means 22, such as from a hose from a gasoline storage truck wherein the hose is interconnected to the upper end means 28 of the inlet riser pipe means 24 in a conventional manner to flow therein under gravity from the truck, will know that the storage tank means 22 is getting close to being completely filled as the flow rate now going into the storage tank 22 after the main valve means 64 is closed has been reduced considerably even though the third valve means 142 is open and continuing to feed fuel into the storage tank 22 but at a greatly reduced rate, such as only approximately two gallons per minute, as previously set forth. Thus, the operator then can close off the flow of fuel to the riser pipe means 24 and the remaining fuel in the riser pipe means 24 will drain through the open valve means 142 to further fill the storage tank means 22 long before the float means 43 would cause closing of the poppet valve means 142.

However, should the operator of the truck leave the gasoline filling operation for some reason, such as by becoming sick or even having a heart attack, the overfill valve 21 of this invention will automatically close the main valve means 64 by the float means 43 rising to the level 123 as illustrated in FIG. 4 and then permit a small continuous filling operation through the poppet valve means 142 until the float means 43 reaches approximately the position illustrated by the dash-dotted lines 143 in FIG. 4 which completely stops any further filling of fuel into the storage tank 22 so that fuel will not be able to pass out of the storage tank 22 through the separate conventional vent line thereof as would be the case if some means were not provided for preventing the continuous flow of fuel into the storage tank means 22 once the tank means has been completely filled.

The poppet valve means 142 comprises a housing means 144 that is disposed and secured in a stepped opening 145 passing through the upper flat surface 74 of the upper offset end 45 of the housing 36, such as being held in the opening 145 by the bracket means 75 that overlaps the housing 144 which is disposed against an internal shoulder means 146 as illustrated. The housing 144 has an opening 147 passing therethrough and defining a frusto-conical valve seat 148 that is adapted to be opened and closed by a frusto-conical valve member 149 that is movable in the housing 144 and has a stem 150 extending from the valve member 149 through the valve seat 148 and being provided with a rounded end 151 which is adapted to engage against a cam surface 152 on the cam member 99 that is rotatably mounted on the shaft means 68 as previously set forth. The stem 150 of the poppet valve member 149 has a spring retainer 153 thereon that is held from moving off of the stem 150 by a conventional C-shaped retaining ring 153' and is urged against the retaining means 153 by a compression spring 154 which has one end 155 bearing against the spring retainer 153 and the other end 156 thereof bearing against an end 144' of the housing means 144 whereby the spring means 154 always tends to move the valve member 149 in a downward direction in the drawings so as to close the valve member 149 against the valve seat 148. However, the cam surface 152 of the cam member 99 is so constructed and arranged that a high surface portion 157 thereof maintains the valve member 149 in an open condition relative to the valve seat 148 until a depressed area 158 of the cam surface 152 is aligned with the end 151 of the stem 150 in the manner illustrated in FIG. 11 to permit the compression spring 154 to close the valve member 149 against the valve seat 148 and thereby close the poppet valve means 142.

The closing of the poppet valve means 142 only takes place when the float means 43 has risen to the position 143 illustrated in FIG. 4 as the float means 43 causes rotation of the cam member 99 as the float means 43 moves in a counterclockwise direction in FIG. 4 and thereby rotates the cam member 99 in a counterclockwise direction in FIGS. 9-11 so that when the float means 43 is in the position 143 of FIG. 4, the low point 158 of the cam surface 152 is aligned with the valve stem 150 to permit the compression spring 154 to close the poppet valve member 149 against the valve seat 148 and maintain the same in such closed position as the float means 43 is now in the position 143 of FIG. 4 because the liquid level in the storage tank 22 has risen to such a position.

In this manner, all flow of fuel to the chamber 30 of the storage tank means 22 is completely terminated by the overfill valve 21 of this invention.

The float means 43 is normally urged to the normal position illustrated by full lines in FIG. 4 by a spring 160 that has a coiled body portion 161 disposed on the shaft means 68 and one opposed end 162 thereof bearing against the wall 44 of the depressed area 41 and the other opposed end 163 thereof bearing against one of the ears 93 of the float means 43.

In this manner, the float means 43 can be moved into the depressed area 41 to permit the overfill valve 21 to be inserted down through the riser pipe means 24 in the manner illustrated in FIG. 2 where the float means 43 is tending to be pivotally moved outwardly by the spring 160 so that the outer face 88 thereof bears against the inside surface 164 of the riser pipe means 24 as illustrated in FIG. 2 and still permit the drop tube means 21 of this invention to be inserted down through the riser pipe means 24 until the upper flange 50 of the section 37 abuts against the shoulder means 54 whereupon the end member 28 is adapted then to be threaded onto the upper end of the riser pipe means 24 to complete the same as previously set forth. At the time that the flange 50 of the upper section 37 aligns with the upper end 54 of the riser pipe means 24, the housing 36 of the tubular member 21 is now within the storage chamber 30 and below the inlet opening 31 thereof so that the force of the spring 160 moves the float means 43 to its out position as illustrated by full lines in FIG. 4 wherein the float means 43 remains in such position until the liquid level reaches the same and begins to float the float means 43 upwardly as previously set forth.

Thus, it can be seen that it is a relatively simple method of this invention to assemble the drop tube 20 of this invention in the storage tank means 22 as the unique shape of the float means 43 permits the same to be contained in the depressed area 41 and, thus, within the outline of the tubular member 21 as the drop tube 20 is being inserted through the riser pipe means 24. Also, the streamlined shape of the ends 47 and 48 of the float means 43 prevents any hang up of the float means 43 during such assembling operation.

In order to normally hold the main-poppet valve member 65 in the full open position as illustrated in FIG. 5, another spring means 165 is provided and has a coiled body portion 166 disposed on a tubular extension 167 (see FIG. 8) of the end 104 of the link 103 while one opposed end 168 thereof bears against the casing 36 and the other opposed end 169 thereof bears against a side 170 of the link 103 so that the stored energy in the spring means 165 tends to rotate the link 103 in a clockwise direction on the shaft means 68 when viewing the shaft means 68 in FIG. 5 and 6. In this manner, the force of the spring 165 tends to maintain the end 115 of the link 107 against the stop 117 and thus in an over center locked position as previously set forth.

The lower section 38 forms a lower extension, of the overfill valve 21' and; also comprises a metallic tubular member having a substantially cylindrical configuration that is provided with a substantially uniform circular cross-sectional configuration throughout the length thereof from the upper end 171 thereof to the lower end 172 thereof which is disposed at an angle to define the outlet end 35 as previously set forth, the upper end 171 being adapted to be telescoped over an inwardly stepped end portion 173 of the housing 36 and be fastened thereto by fastening means 174 into suitable slots 175 of the housing 36. However, the upper end 171 of the extension 38 need not be secured to the lower end 173 of the housing 36 with as great a securement arrangement as the end 56 of the upper extension 37 is secured to the upper end of the housing 36 as the lower extension 38 is not subjected to the pounding that the upper extension 37 is subjected to during the closing of the valve means 64 as previously set forth.

Therefore, it can be seen that the overfill valve 21' of this invention can be formed of the various parts of this invention and be assembled together by the method of this invention to provide a drop tube 20 which is adapted to operate in a manner now to be described.

Once the drop tube 20 has been installed in its operative position; in the riser pipe means 24 so that the housing 36 thereof is in the storage compartment 30 as previously set forth with the float means 43 being held outwardly by the spring means 160 in the full line position of FIG. 4, the main valve means 65 is being held in its full open position under the deflector means 119 by the spring means 165. Thus, when an operator desires to fill the storage tank 22 by removing the cover means 27 and attaching a dispensing hose from the gasoline truck to the upper end means 28 of the riser pipe means 24 in a conventional manner, fuel can be directed downwardly through the upper extension 37 of the tubular member 21 and through the open valve means 64 to pass out of the end 35 of the lower extension 38 to begin to fill the chamber 30 of the storage tank means 22 as previously set forth, the flow of fuel down through the tubular member 21 being deflected away from the valve member 65 by the deflector means 119 as previously set forth.

However, when the level 102 of fuel in the chamber 30 of the storage tank means 22 causes the float means 43 to begin to float and thereby move upwardly from the full line position illustrated in FIG. 4 to the phantom line position 123, such movement of the float means 43 causes both the drive means 98 and the cam means 99 to rotate in opening means 69. However, only the drive part 124 of the drive means 98 engages against the surface 125 of the link 103 to cause the link 103 to begin to rotate in a counter clockwise direction in FIGS. 5 and 6 and move the valve member 65 outwardly into the stream 122 of fuel which catches against the forward end 127 of the valve member 65 and rapidly moves the same downwardly against the valve seat 71 to close the valve seat 71. This initial shock load or head of fuel now being held above the closed valve member 65 forces through the opening 129 of the valve member 65 by moving the valve member 132 away from the underside 130 of the valve member 65 in opposition to the force of the spring means 136 so as to momentarily relieve the force of the fuel in the drop tube 20 that would be acting downwardly on the closed valve member 65. Once this initial head of fuel passes through the opening means 129 to the chamber 30 of the storage tank means 22, the valve member 132 is urged by the spring means 136 back to its closed position as illustrated by phantom lines in FIG. 6 so that the only flow of fuel now into the storage chamber 30 of the storage tank means 22 is through the open poppet valve means 142 which is still being held in the open position by the high area 157 of the cam surface 152. However, should the flow of fuel continue to flow through the open valve means 142 for several hours after the valve means 64 has been closed in the manner previously set forth, the level of fuel in the chamber 30 of the storage tank means 22 causes the float means 43 to move to the position illustrated by the phantom lines 143 in FIG. 4 and thereby rotate the cam member 99 so that the low portion 158 thereof is now aligned with the valve stem 150 so that the compression spring 154 can close the poppet valve member 149 against the poppet valve seat 148 and terminate any further flow of fuel into the storage tank means 22.

In this manner, a complete overfilling of the storage tank means 22 is prevented by the overfill valve construction 21' of this invention so that fuel cannot be continuously pumped into the chamber 30 thereof and pass out through the vent pipe thereof to spill onto the ground, etc.

Of course, once a filling operation has been terminated and as the level of the fuel in the storage tank 22 begins to fall because of the fuel being pumped out of the chamber thereof by the normal operation of the filling station or the like, the float means 43 begins to move downwardly and such downward movement of the float means 43 first causes the poppet valve member 149 to be moved to an open position through the cam 99 in opposition to the force of the compression spring 154 and then causes the main valve member 65 to be moved to its full open position as the drive part 124 of the drive means 98 has been moved sufficiently away from its tripping position so that the force of the spring 165 can return the link means 70 to the position of FIG. 5 once the head of fuel above the valve means 65 has been relieved by the now open poppet valve means 142 and the level in the chamber 30 has fallen sufficiently to permit the float means 43 to move to the full line position illustrated in FIG. 4. Even though the fuel level now falls below the position that permits the float means 43 to be in the full line position illustrated in FIG. 4, the float means 43 will not follow the falling liquid level within the chamber 30 of the storage tank means 22 as the spring means 160 maintains the float means 43 in the full line position illustrated in FIG. 4 so that the overfill valve 21' of this invention can again perform its function in preventing an overfill condition during a subsequent filling operation in the manner previously described.

Therefore, it can be seen that this invention provides a new overfill valve construction having many unique features that operate in the manner previously set forth.

While the forms and methods of this invention now preferred have been illustrated and described as required by the Patent Statute, it is to be understood that other forms can be utilized and still fall within the scope of the appended claims.

What is claimed is:

1. An overfill valve adapted for incorporation in a drop tube employed in the discharge of liquid fuel, or the like, into a storage tank having an inlet riser pipe, said overfill valve comprising, a tubular housing insertable through the riser pipe and defining a passage through which fuel may be discharged into the tank, said housing having an upper end adapted for attachment to an upper tubular extension which is engageable with the riser pipe to position the housing in an operative position in the upper portion of the storage tank, and a lower end adapted for attachment to a lower tubular extension which terminates in the bottom portion of the storage tank, said overfill valve further comprising a valve member disposed within said housing and movable between an open position and a closed position, a float mounted on the housing and projecting laterally therefrom when the housing is in its operative position, and means connecting said valve member and float, said connecting means, in the operative position of the housing, displacing the valve member towards its closed position in response to upward movement of the float to a position reflecting a desired height for fuel in the tank, characterized in that said housing has a depression, and said float is displaceable to an insertion position in which the float is disposed in said depression and the housing is insertable through the riser pipe.

2. An overfill valve as in claim 1 adapted for use in discharging fuel into a tank having a riser pipe which has a circular cross section with a given inner diameter, and the housing has a generally circular, vertical outline having a diameter less than the inner diameter of the riser pipe, and said depression is spaced inwardly from said vertical outline.

3. An overfill valve as in claim 2 wherein said depression is formed by an integral wall portion of said housing.

4. An overfill valve as in claim 3 wherein the depression is defined by vertically spaced upper and lower shoulders and the wall portion of the housing which is disposed on a chord of said circular, vertical outline.

5. An overfill valve as in claim 4 wherein the float is elongated and has a cross section in the form of a segment generated by a radius approximating the radius of the circular outline of the housing and a thickness approximating the distance the depression is spaced inwardly from said vertical outline.

6. An overfill valve as in claim 1 wherein the depression is defined by vertically spaced upper and lower shoulders, and the connecting means include means pivotally mounting one end of the float on said housing about a horizontal axis above the upper depression shoulder, and said one end of the float is adjacent the upper depression shoulder and the other end of the float is adjacent the lower depression shoulder when the float is in its insertion position.

7. An overfill valve as in claim 6 further including means for resiliently urging the float to its laterally projecting position.

8. An overfill valve as in claim 6 wherein the axis for pivotally mounting the float is spaced inwardly from the vertical outline of the housing and further includes angled deflector means, engagable with the riser pipe upon removal of the valve from the tank, for displacing the float towards its insertion position.

9. An overfill valve adapted for incorporation in a drop tube employed in the discharge of liquid fuel, or the like, into a storage tank having an inlet riser pipe, said overfill valve comprising, a tubular housing insertable through the riser pipe and defining a passage through which fuel may be discharged into the tank, said housing having an upper end adapted for attachment to an upper tubular extension which is engageable with the riser pipe to position the housing in an operative position in the upper portion of the storage tank, and a lower end adapted for attachment to a lower tubular extension which terminates in the bottom portion of the storage tank, said overfill valve further comprising a valve member disposed within said housing and movable between an open position and a closed position, approximating the distance the depression is spaced inwardly from said vertical outline, one end of the float is pivotally mounted on said housing about an axis above the upper shoulder of the depression, beneath and parallel to the axis for the valve member, said float being displaceable to an insertion position in which the float is disposed in said depression and the housing is insertable through the riser pipe.

10. An overfill valve as in claim 9 wherein the means for limiting pressure comprise a relatively large opening through said valve member and resilient valve means, mounted on said valve member, normally closing said opening, said resilient valve means being opened by the velocity force of fuel being discharged into the tank and closing when the velocity force is reduced below a given level.

11. An overfill valve as in claim 10 wherein the resilient valve means closes said opening when the velocity of fuel discharged into the tank is reduced below a given level, and further comprises means for bleeding fuel in the housing, above said valve member, when the valve member is in its closed position.

12. An overfill valve as in claim 11 further comprising means for closing said means for bleeding in response to movement of the float means to a position reflecting that the level of fuel in the tank is at a predetermined height above said desired height.

13. An overfill valve as in claim 9 adapted for use in discharging fuel into a tank having a riser pipe which has a circular cross section with a given inner diameter, and wherein the housing has a circular, vertical outline having a diameter less than the inner diameter of the riser pipe, the housing has a planar valve seat, and the valve member is pivotally mounted on said housing and is spaced from the valve seat in its open position and engaged with said seat in its closed position.

14. An overfill valve as in claim 13 wherein the valve member is pivotally mounted on a horizontal axis disposed to one side of the valve seat and is disposed in an upright position with one, upper end contiguous with an inner wall portion of the housing, outwardly of the pivot axis, when in its open position, whereby the force of fuel discharged into said tank will maintain the valve member in its open position, and further wherein the valve member is freely pivotal from said open position to said closed position, when the float means is in a position reflecting the desired height of fuel in the tank and the connecting means comprise means for swinging the valve member to a position in which its upper end is positioned on the other side of the its pivot axis, whereby the force of fuel discharged into the tank swings the valve member to its closed position.

15. An overfill valve as in claim 14 wherein the valve seat is angled upwardly, relative to the pivot axis for the valve member, on an angle of approximately 45 deg.

16. An overfill valve as in claim 15 wherein the means for limiting pressure comprise a relatively large opening through said valve member and resilient valve means, mounted on said valve member, normally closing said opening, said resilient valve means being opened by the velocity force of fuel being discharged into the tank and closing when the velocity force is reduced below a given level.

17. An overfill valve as in claim 16 further comprising a bleed passage extends through said housing from the upstream side of the valve seat to the downstream side thereof, normally open valve means for closing said bleed passage, and means, responsive to movement of said float means, for closing said the bleed passage valve in response to movement of the float to a position reflecting that the level of fuel in the tank is at a predetermined height above said desired height.

18. An overfill valve as in claim 17 wherein the housing has a depression formed therein beneath said valve seat, said depression being defined by vertically spaced shoulders and a wall portion of the housing which is disposed on a chord of said circular, vertical outline, the float means comprise a float projecting laterally from the housing, when the housing is in its operative position, and the float is elongated and has a cross section in the form of a segment generated by a radius approximating the radius of the circular outline of the housing and a thickness approximating the distance the depression is spaced inwardly from said vertical outline, one end of the float is pivotally mounted on said housing about an axis above the upper shoulder of the depression, beneath and parallel to the axis for the valve member, said float being displaceable to an insertion position in which the float is disposed in said depression and the housing is insertable through the riser pipe.

19. An overfill valve as in claim 18 wherein the connecting means include a link having one end pivotally connected to said valve member, a lever pivotal about the axis for the float and pivotally connected to the opposite end of said link, and abutment means also pivotal relative to the float axis, which move with said float and engage said lever to swing it to a position in which the one end of valve member is swung inwardly of the pivot axis therefor.

20. An overfill valve as in claim 19 wherein the bleed passage valve means and the response means therefor comprise a poppet valve disposed above the float axis;

a cam mounted on the float axis and rotatable with said float, said poppet valve having a spring loaded stem riding on said cam, said cam having a contour which maintains the poppet valve stem in an open position until the float is float is raised to a position refecting the predetermined level above the desired level of fuel in the tank whereat the cam has a depression permitting the bleed passage valve to close.

21. An overfill valve adapted for incorporation in a drop tube employed in the discharge of liquid fuel, or the like, into a storage tank having an inlet riser pipe, said overfill valve comprising, a tubular housing insertable through the riser pipe and defining a passage through which fuel may be discharged into the tank, said housing having an upper end adapted for attachment to an upper tubular extension which is engageable with the riser pipe to position the housing in an operative position in the upper portion of the storage tank, and a lower end adapted for attachment to a lower tubular extension which terminates in the bottom portion of the storage tank, said overfill valve further comprising a valve member disposed within said housing and movable between an open position and a closed position, float means mounted on the housing and responsive to the level of fuel in the tank, when the housing is in its operative position, and means connecting said valve member and float means, said connecting means, in the operative position of the housing, displacing the valve member towards its closed postion in response to upward movement of the float means to a position reflecting a desired height for fuel in the tank, the improvement which comprises means for reducing the rate of flow of fuel discharged into the tank through the housing in response to movement of the float means to a position reflecting said desired height, and means for preventing further discharge of fuel into said tank, through said housing, in response to movement of the float means to a level reflecting a predetermined level above said desired level.

22. An overfill valve adapted for incorporation in a drop tube employed in the discharge of liquid fuel, or the like, into a storage tank having an inlet riser pipe, said overfill valve comprising, a tubular housing insertable through the riser pipe and defining a passage through which fuel may be discharged into the tank, said housing having an upper end adapted for attachment to an upper tubular extension which is engageable with the riser pipe to position the housing in an operative position in the upper portion of the storage tank, and a lower end adapted for attachment to a lower tubular extension which terminates in the bottom portion of the storage tank, said overfill valve further comprising
a valve member disposed within said housing and movable between an open position and a closed position,
float means mounted on the housing and responsive to the level of fuel in the tank when the housing is in its operative position,
means connecting said valve member and float means, said connecting means, in the operative position of the housing, displacing the valve member towards its closed position in response to upward movement of the float means to a position reflecting a desired height for fuel in the tank, and
a bleed passage, formed in said housing for draining fuel from above the valve member when the valve member is in its closed position,
characterized by
valve means, operative in response to movement of the float means to a position reflecting that the level of fuel in the tank is at a predetermined height above said desired level, for blocking flow of fuel through said bleed passage.

23. An overfill valve as in claim 22 wherein
the valve means comprise a poppet valve,
the float means comprise a float projecing laterally from the housing, when the housing is in its operative position, and
a horizontal shaft is mounted on the housing and the float is mounted thereon,
the bleed passage and poppet valve are vertically disposed in alignment with said shaft, and
further comprising
a cam mounted on said shaft for rotation with said float,
resilient means urging the poppet valve stem into engagement with said cam,
said cam having a contour maintaining the poppet valve in an open position until the float is raised to a position reflecting a level of fuel in the tank at a predetermined distance above said desired height.

24. An overfill valve adapted for incorporation in a drop tube employed in the discharge of liquid fuel, or the like, into a storage tank having an inlet riser pipe, said overfill valve comprising,
a tubular housing insertable through the riser pipe and defining a passage through which fuel may be discharged into the tank, said housing having
an upper end adapted for attachment to an upper tubular extension which in engageable with the riser pipe to position the housing in an operative position in the upper portion of the storage tank, and
a lower end adapted for attachment to a lower tubular extension which terminates in the bottom portion of the storage tank,
said overfill valve further comprising
a valve seat peripheral of the inner wall of said housing,
a valve member disposed within said housing and pivotally mounted to the housing for movement between an open position and a closed position,
float means mounted on the housing and responsive to the level of fuel in the tank, when the housing is in its operative position, and
means connecting said valve member and float means, said connecting means, in the operative position of the housing, displacing the valve member towards its closed position in response to upward movement of the float means to a position reflecting a desired height for fuel in the tank,
characterized in that
the valve member has a planar sealing surface and
the valve seat is disposed on an angle relative to the axis of the housing.

25. An overfill valve as in claim 24 wherin
the valve seat is disposed on an angle of approximately 45 deg. relative to the axis of the housing.

26. An overfill valve as in claim 25 adapted for use in discharging fuel into a tank having a riser pipe which has a circular cross section with a given inner diameter, and
the housing has a circular, vertical outline having a diameter less than the inner diameter of the riser pipe, and wherein
the portion of the housing above the valve seat has a circular inner diameter and the valve seat is elliptical,
the valve member is pivotally mounted on a horizontal axis disposed to one side of the valve seat and is disposed in an upright position with one, upper end contiguous with an inner wall portion of the housing. when in its open position, and
the upper end of the valve member is formed on a curvature approximating the curvature of the valve seat.

27. An overfill valve as in claim 26 wherein
the valve member is angled outwardly from its pivot axis in its open position.

28. An overfill valve as in claim 27 further including
means for adjusting the angular position of the valve member in its open position so that assurance can be had that it is angled outwardly to a desired extent.

29. An overfill valve adapted for incorporation in a drop tube employed in the discharge of liquid fuel, or the like, into a storage tank having an inlet riser pipe, said overfill valve comprising,
a tubular housing insertable through the riser pipe and defining a passage through which fuel may be discharged into the tank, said housing having
an upper end adapted for attachment to an upper tubular extension which is engageable with the riser pipe to position the housing in an operative position in the upper portion of the storage tank, and
a lower end adapted for attachment to a lower tubular extension which terminates in the bottom portion of the storage tank,
said overfill valve further comprising
a valve seat peripheral of the inner wall of said housing,
a valve member disposed within said housing and pivotally mounted on the housing for movement between an open position and a closed position,
float means mounted on the housing and responsive to the level of fuel in the tank, when the housing is in its operative position, and
means connecting said valve member and float means, said connecting means, in the operative position of the housing, displacing the valve member towards its closed position in response to upward movement of the float means to a position reflecting a desired height for fuel in the tank,
characterized in that
means are disposed to one side of said valve seat for pivotally mounting said valve member on said housing with the valve member being generally upright in its open position, said connecting means pivot the valve member toward the said valve seat so that the force of fuel being discharged through the housing displaces the valve member to its closed position, further characterized by the float means movement being non-responsive to movement of the valve member towards its closed position.

30. An overfill valve as in claim 29 wherein the float means comprise a float mounted on the housing and projecting laterally therefrom when the housing is in its operative position, and the means connecting said valve member and float means comprise a connection with said float, characterized by means pivotally mounting said float on said housing said pivotally mounting means including a mounting portion disposed within the vertical outline of said housing, resilient means, disposed within the outline of said housing, for urging said valve member toward its open position, said connecting means including linkage means and abutment means operatively associated with said mounting portion of the float mounting means, further characterized by movement of the valve member towards its closed position disengaging the abutment means, of the connecting means, whereby the float movement is non-responsive to movement of the valve member towards its closed position.

31. An overfill valve as in claim 30 further comprising means for limiting pressure on said valve member when it is moved to its closed position, said means comprising a relatively large opening through said valve member and resilient valve means, mounted on said valve member, normally closing said opening, said resilient valve means being opened by the velocity force of fuel being discharged into the tank and closing when the velocity force is reduced below a given level.

32. An overfill valve as in claim 31 wherein a third shaft is mounted on said valve member in parallel relation to the first and second shafts, the upper end of said link is mounted on said third shaft, the valve means for said opening is disposed on the under side of said valve member when it is in its closed position and comprises a flapper valve pivotally mounted on said third shaft and torsion spring coiled about said shaft and urging the flapper valve into engagement with the under surface of the valve member to seal the opening therein.

33. An overfill valve as in claim 30 wherein the means for pivotally mounting the valve member comprises a first horizontally disposed shaft mounted on said housing interiorly thereof and to one side of the valve seat, the valve member being pivotally mounted on said first shaft and is disposed in an upright position with one, upper end contiguous with an inner wall portion of the housing, when in its open position, and the means for pivotally mounting the float comprises a second shaft, disposed beneath the first shaft and parallel thereto, mounted on said housing, said float being pivotally mounted on said second shaft, said linkage means comprise a lever pivotally mounted on said second shaft, and a link pivotally connected, at its opposite ends, respectively, to the valve member and the lever, and the abutment means are pivotal on said shaft and rotatable in response to movement of the float, and engagable with the lever to displace it in a direction causing the valve member to move towards its closed position when the float is raised to a position reflecting the desired level of fuel in the tank.

34. An overfill valve as in claim 33 further comprising means for bleeding fuel in the housing, above said valve member, when the valve member is in its closed position, said bleeding means comprising a vertical passage formed in said housing in alignment with said second shaft, and extending from the upstream side of said valve seat to the downstream side thereof, a poppet valve mounted in said bleed passage and having a stem extending downwardly therefrom, a cam pivotally mounted on said second shaft and movable in response to movement of said float, resilient means urging the poppet valve stem into engagement with said cam, said cam having a contour maintaining the poppet valve in an open position until the float is raised to a position reflecting a level of fuel in the tank at a predetermined distance above said desired height.

35. An overfill valve as in claim 33 wherein the resilient means for urging said valve member toward its open position comprise a torsion spring coiled about said second shaft and acting on said lever in a direction yieldingly urging said valve member to its open position.

36. An overfill valve as in claim 33 further comprising a third shaft mounted on said valve member in parallel relation to said first and second shafts, and linkage means connecting said first and third shafts, and further wherein the link connecting said lever and valve member is connected to said third shaft.

37. An overfill valve as in claim 29 further characterized in that said connecting means are positively connected to valve member and are provided with a lost motion connection with said float means, said lost motion connection permitting movement of the connecting means relative to the float means, as the connecting means moves with the valve member and the float means remains at the level of the liquid in the tank.

38. A drop tube adapted for use in the discharge of liquid fuel, or the like, at a relatively high rate, into a storage tank of the type having an inlet riser pipe, the drop tube having an overfill valve for limiting the discharge of fuel into the storage tank, said drop tube comprising a tubular member insertable through the riser pipe to an operative position of the drop tube and defining a passage through which fuel is discharged into the tank, and said overfill valve comprising a valve member disposed within said tubular member and movable between an open position and a closed position, float means mounted on the tubular member and responsive to the level of fuel in the tank, when the drop tube is in its operative position, and means connecting said valve and float means, said connecting means, in the operative position of the drop tube, displacing the valve member towards its closed position in response to upward movement of the float means to a position reflecting a desired height for fuel in the tank, the improvement which comprises means, operative when the valve member is moved to its closed position, for limiting fuel pressure on said valve member which is the result of the flow force of fuel being discharged into the tank.

39. A drop tube adapted for use in the discharge of liquid fuel, or the like, at a relatively high rate, into a storage tank of the type having an inlet riser pipe, the drop tube having an overfill valve for limiting the discharge of fuel into the storage tank, said drop tube comprising a tubular member insertable through the riser pipe to an operative position of the drop tube and defining a passage through which fuel is discharged into the tank, and said overfill valve comprising a valve member disposed within said tubular member and movable between an open position and a closed position, float means mounted on the tubular member and responsive to the level of fuel in the tank, when the drop tube is in its operative position, and means connecting said valve and float means, said connecting means, in the operative position of the drop tube, displacing the valve member towards its closed position in response to upward movement of the float means to a position reflecting a desired height for fuel in the tank, the improvement which comprises means for reducing the rate of flow of fuel discharged into the tank through the drop tube in response to movement of the float to a position reflecting said desired height, and means for preventing further discharge of fuel into said tank, through said drop tube, in response to movement of the float means to a level reflecting a predetermined level above said desired level.

40. A drop tube adapted for use in the discharge of liquid fuel, or the like, into a storage tank of the type having an inlet riser pipe, the drop tube having an overfill valve for limiting the discharge of fuel into the storage tank, said drop tube comprising a tubular member insertable through the riser pipe to an operative position of the drop tube and defining a passage through which fuel is discharged into the tank, and said overfill valve comprising a valve member disposed within said tubular member and movable between an open position and a closed position, float means mounted on the tubular member and responsive to the level of fuel in the tank, when the drop tube is in its operative position, means connecting said valve and float means, said connecting means, in the operative position of the drop tube, displacing the valve member towards its closed position in response to upward movement of the float means to a position reflecting a desired height for fuel in the tank, and a bleed passage for draining fuel from above the valve member when the valve member is in its closed position, characterized by valve means, operative in response to movement of the float means to a position reflecting that the level of fuel in the tank is at a predetermined height above said desired level, for blocking flow of fuel through said bleed passage.

41. A drop tube adapted for use in the discharge of liquid fuel, or the like, into a storage tank of the type having an inlet riser pipe having a circular cross section, said drop tube having an overfill valve for limiting the discharge of fuel into the storage tank, said drop tube comprising a tubular member having a circular, vertical outline having a diameter less than the inner diameter of the riser pipe to thereby facilitate its insertion through the riser pipe to an operative position of the drop tube, and said overfill valve comprising a valve seat peripheral of the inner wall of said tubular member, a valve member disposed within said tubular member and pivotally mounted on the tubular member for movement between an open position and a closed position, float means mounted on the tubular member and responsive to the level of fuel in the tank, when the drop tube is in its operative position, and means connecting said valve and float means, said connecting means, in the operative position of the drop tube, displacing the valve member towards its closed position in response to upward movement of the float means to a position reflecting a desired height for fuel in the tank, characterized in that the drop tube comprises a tubular housing, means are disposed to one side of said valve seat for pivotally mounting said valve member on said housing with the valve member being generally upright in its open position, further characterized by the float means movement being non-responsive to movement of the valve member towards its closed position.

* * * * *